United States Patent
Dixon et al.

(10) Patent No.: US 10,302,499 B2
(45) Date of Patent: May 28, 2019

(54) ADAPTIVE THRESHOLD MANIPULATION FOR MOVEMENT DETECTING SENSORS

(71) Applicant: Google Inc., Mountain View, CA (US)

(72) Inventors: Michael Dixon, Sunnyvale, CA (US); Andrew Goldenson, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 541 days.

(21) Appl. No.: 14/523,078

(22) Filed: Oct. 24, 2014

(65) Prior Publication Data
US 2016/0116343 A1    Apr. 28, 2016

(51) Int. Cl.
| | |
|---|---|
| G01J 5/32 | (2006.01) |
| G05B 15/02 | (2006.01) |
| G08B 29/26 | (2006.01) |
| H05B 37/02 | (2006.01) |
| G01J 1/44 | (2006.01) |
| G08B 13/191 | (2006.01) |
| G08B 19/00 | (2006.01) |

(52) U.S. Cl.
CPC . *G01J 5/32* (2013.01); *G01J 1/44* (2013.01); *G05B 15/02* (2013.01); *G08B 13/191* (2013.01); *G08B 29/26* (2013.01); *H05B 37/0218* (2013.01); *H05B 37/0227* (2013.01); *H05B 37/0272* (2013.01); *G05B 2219/2642* (2013.01); *G08B 19/005* (2013.01); *Y02B 20/44* (2013.01); *Y02B 20/46* (2013.01)

(58) Field of Classification Search
CPC .......................................................... G01J 5/32
See application file for complete search history.

(56) References Cited

U.S. PATENT DOCUMENTS

| | | | |
|---|---|---|---|
| 6,384,414 B1 | 5/2002 | Fisher et al. | |
| 2013/0204442 A1* | 8/2013 | Modi | F24F 11/0009 700/278 |

OTHER PUBLICATIONS

Sang Gi Hong et al.; "Reduction of False Alarm Signals for PIR Sensor in Realistic Outdoor Surveillance", ETRI Journal, Feb. 2013, pp. 80-88.
Partial International Search Report for PCT Application No. PCT/US2015/054001 dated Mar. 21, 2016, 5 pgs.

* cited by examiner

*Primary Examiner* — David P Porta
*Assistant Examiner* — Carolyn Fin
(74) *Attorney, Agent, or Firm* — Van Court & Aldridge LLP

(57) ABSTRACT

A method for adaptively adjusting a threshold used to detect the presence of a living being may include receiving a first set of sensor measurements acquired by a passive infrared (PIR) sensor during a time period when the living being is not expected to be present in a space monitored by the PIR sensor. Here, the sensor measurements may depend on one or more noise sensitivity characteristics of the PIR sensor. The method may include adjusting a threshold that may indicate a presence of the living being based on the first set of sensor measurements. The method may then receive a second set of sensor measurements acquired by the PIR sensor and detect the presence of the living being when at least one of the second set of sensor measurements exceeds the threshold.

10 Claims, 13 Drawing Sheets

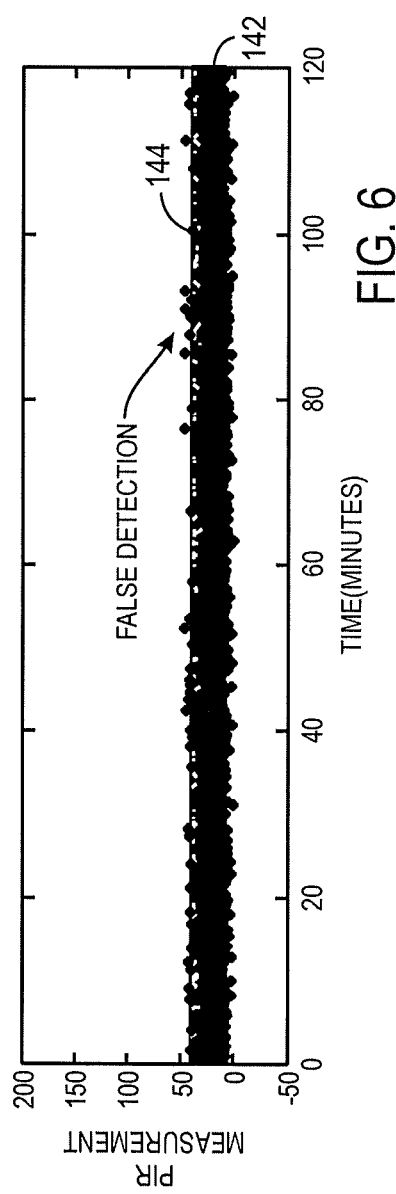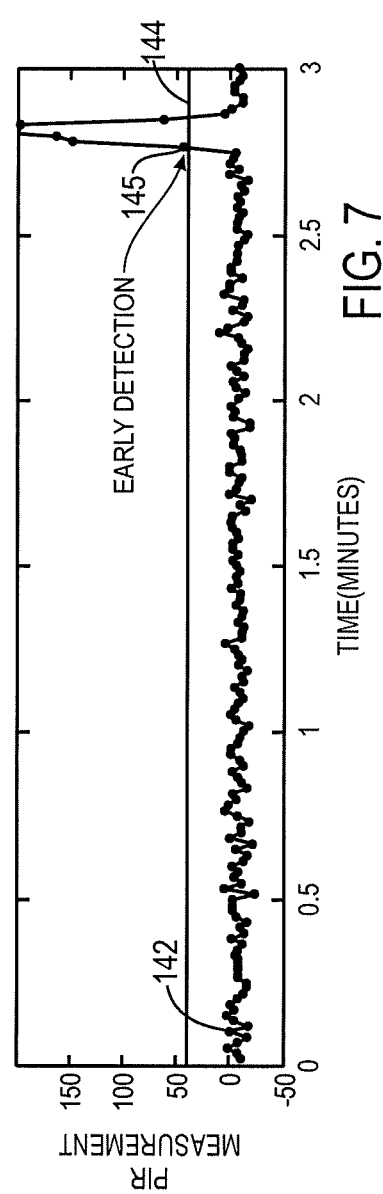

ADAPTIVE THRESHOLD MANIPULATION FOR MOVEMENT DETECTING SENSORS

BACKGROUND

The present disclosure relates generally to detecting movement of objects to infer a presence of a living being. More specifically, the present disclosure relates to adaptively adjusting a threshold associated with sensor measurements used to detect a movement of objects to infer presence of a living being.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of smart electronic devices may control temperatures, detect hazardous environments, or perform other functions in a building such as a home or office. These electronic devices may vary their operation depending on whether a human being is occupying the building. For example, the electronic devices may save energy by efficiently controlling certain environmental properties, such as temperature, based on whether a human being is present in the building. To detect the presence of the human being, one or more of the electronic devices may use an occupancy sensor (e.g., a passive infrared (PIR) sensor) to sense the presence of the human when measurements acquired by the sensors exceed a certain occupancy threshold.

Yet no occupancy sensor is perfect. Indeed, each occupancy sensor may produce measurement signals that include some level of noise. As a result, the electronic devices may be programmed to use an occupancy threshold that is greater than the expected noise level of its occupancy sensor to avoid false positives due to noise. The actual amount of noise from any given occupancy sensor, however, may vary substantially over the course of time due to, e.g., changing environmental conditions (i.e., temperature, humidity, etc.), sensor degradation, changes in battery level, etc. Moreover, the amount of noise produced by different occupancy sensors may vary even in the same environmental conditions due to, e.g, manufacturing tolerance levels. Thus, to avoid false positives in any of the electronic devices, the occupancy thresholds may be selected based on the noisiest occupancy sensors that may be found in the electronic devices. As a result of having unnecessarily high occupancy thresholds, many electronic devices may have an undesirably low occupancy detection sensitivity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to an electronic device, such as a thermostat or a hazard detector (e.g., smoke detector) that may be disposed in a building (e.g., home or office), such that the electronic device may detect the presence of a human being in the building. As mentioned above, each electronic device may use a sensor to sense the presence of the human when measurements acquired by the sensors are above a certain threshold. Generally, manufacturers of the electronic device may determine the value for the threshold and use the determined threshold for each of its electronic devices. However, since the sensor used to detect human presence in each electronic device may have different sensitivity characteristics with respect to noise, different electronic devices may detect a presence of the same human being at different times. For example, sensors less sensitive to noise may detect the presence of the human later than sensors more sensitive to noise. Further, some electronic devices may falsely detect the presence of a human being when the sensors measurements correspond to the presence of an animal, such as a pet.

To improve the consistency in detecting human beings in these electronic devices, the threshold used to denote the presence of a human being with respect to the sensor measurements may be adaptively adjusted for each individual electronic device according to the sensitivity characteristics of a respective sensor. That is, the threshold for human detection may be recalibrated, recalculated, or adjusted throughout the lifecycle of the electronic device. For example, in one embodiment, a processor may collect sensor measurements from a passive infrared (PIR) sensor when a respective building or a respective part of the respective building is expected to be unoccupied by a human. Using the sensor measurements collected during this time period, the processor may determine a threshold for detecting the presence of a human being based on the collected sensor measurements, which may be susceptible to various noise characteristics inherent in the respective sensor. As a result, each respective electronic device may more accurately detect the presence of a human regardless of the noise sensitivity levels of its respective sensor.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 illustrates a graph of sensor measurements associated with PIR sensors and a threshold associated with falsely detecting a presence of a human being, in accordance with an embodiment;

FIG. 7 illustrates a graph of sensor measurements associated with PIR sensors and a threshold associated with early detection of a presence of a human being, in accordance with an embodiment;

DETAILED DESCRIPTION OF SPECIFIC EMBODIMENTS

Figure 1:
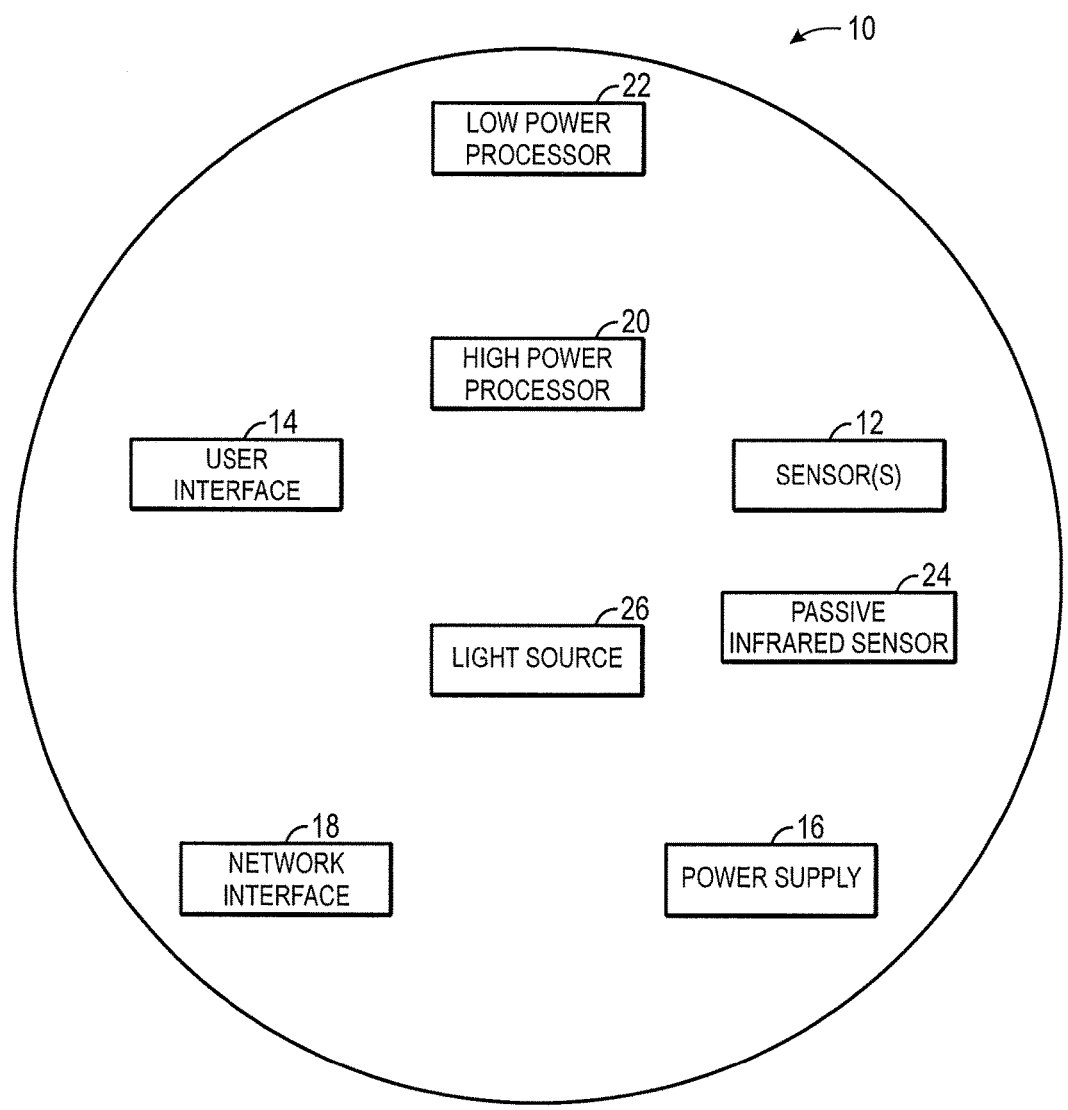
FIG. 1 illustrates a block diagram of a general device that may control and/or monitor a building environment, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relate to an electronic device, such as a thermostat or a hazard detector (e.g., smoke detector) that may be disposed in a building (e.g., home or office), such that the electronic device may detect the presence of a human being in the building and distinguish between the presence of the human being and other objects/animals such as a pet. Generally, the electronic device may employ a sensor, such as a passive infrared (PIR) sensor, to detect the presence of a human being. However, each PIR sensor may be inherently sensitive to different levels of noise. By accounting for the different sensitivity levels of each PIR sensor, the electronic device may improve its detection of human beings and better distinguish between the presence of human beings and other objects/animals such as pets.

Keeping this in mind, the electronic device may include a low-power processor that may store the sensor measurements acquired by the PIR sensor during a time period when the electronic device does not expect a human in the building or portion of the building being monitored by electronic device. In one embodiment, after storing the sensor measurements over some period of time, the low-power processor may send the stored sensor measurements to a high-power processor of the electronic device. The high-power processor may then calculate a threshold or adjust the previous threshold for determining a presence of a human based on the stored sensor measurements that correspond to the time period when a human being is likely not present in the building. The high-power processor may then send the newly calculated or the adjusted threshold to the low-power processor. The low-power processor may then use the newly calculated or the adjusted threshold to detect the presence of a human. Since the new threshold is calculated based on the sensor measurements from a particular PIR sensor of a particular electronic device, the new threshold may compensate for the inherent sensitivity characteristics of that particular PIR sensor. As a result, the electronic device may detect the presence of a human being more effectively and efficiently.

Smart Device in Smart Home Environment

By way of introduction, FIG. 1 illustrates an example of a general electronic device 10 that may be disposed inside or outside of a structure. In one embodiment, the device 10 may include one or more sensors 12, a user-interface component 14, a power supply 16 (e.g., including a power connection and/or battery), a network interface 18, a high-power processor 20, a low-power processor 22, a passive infrared (PIR) sensor 24, a light source 26, and the like.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver (s) or radiofrequency identification detector(s) infrared sensor(s), continuous wave radar sensor(s), ultrasonic sound wave sensor(s), microwave sensor(s), tomographic motion sensor(s), vibration sensor(s), a combination of the aforementioned sensors, and the like. While FIG. 1 illustrates an embodiment with a single sensor, many embodiments may include multiple sensors. In some instances, the device 10 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives or smart-operation objectives.

One or more components of the user-interface 14 in the device 10 may receive input from the user and/or present information to the user. The received input may be used to determine a setting to configure operation of the device 10. In certain embodiments, the user-interface components may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a component of the user-interface 14 or based on a displacement of a component of the user-interface 14 (e.g., adjusting a set point temperature by 1 degree F. for every 10° rotation of a rotatable-ring component). Physically and virtually movable user-interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component may be associated with a magnitude of a setting adjustment, such that a user may dramatically alter a setting with a large movement or finely tune a setting with a small movement.

The user-interface 14 may also or alternatively include one or more buttons (e.g., up and down buttons), a keypad, a number pad, a switch, a microphone, and/or a camera (e.g., to detect gestures). In one embodiment, the user-interface 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface 14 may include a camera that may detect gestures (e.g., to indicate that a power or alarm state of a device is to be changed). In some instances, the device 10 may have one primary input component, which may be used to set a number of types of settings. The user-interface 14 may also be configured to present information to a user via, e.g., a visual display (e.g., a thin-film-transistor display or organic light-emitting-diode display) and/or an audio speaker.

The power-supply 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices. As such, the network interface 18 may enable the device 10 to communicate with other devices 10 via a wired or wireless network. The network interface 18 may include a wireless card or some other transceiver connection to facilitate this communication.

The high-power processor 20 and the low-power processor 22 may support one or more of a variety of different device functionalities. As such, the high-power processor 20 and the low-power processor 22 may each include one or more processors configured and programmed to carry out and/or cause to be carried out one or more of the functionalities described herein. In one embodiment, the high-power processor 20 and the low-power processor 22 may include general-purpose processors carrying out computer code stored in local memory (e.g., flash memory, hard drive, random access memory), special-purpose processors or application-specific integrated circuits, combinations thereof, and/or using other types of hardware/firmware/software processing platforms. In certain embodiments, the high-power processor 20 may execute computationally intensive operations such as operating the user-interface component 14 and the like. The low-power processor 22, on the other hand, may manage less complex processes such as detecting a hazard or temperature from the sensor 12. The high-power processor 20 may have a higher operating power requirement than the low-power processor 22. In one embodiment, the low-power processor may wake or initialize the high-power processor for computationally intensive processes.

By way of example, the high-power processor 20 and the low-power processor 22 may detect when a location (e.g., a house or room) is occupied (i.e., includes a presence of a human), up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an internet protocol (IP) address of a received signal, detecting operation of one or more devices within a time window, or the like. Moreover, the high-power processor 20 and the low-power processor 22 may include image recognition technology to identify particular occupants or objects.

In certain embodiments, the high-power processor 20 and/or the low-power processor 22 may detect the presence of a human using the PIR sensor 24. The PIR sensor 24 may be a passive infrared sensor that may measures infrared (IR) light radiating from objects in its field of view. As such, the PIR sensor 24 may detect the Infrared radiation emitted from an object.

In some instances, the high-power processor 20 may determine desirable settings and/or implement those settings based sensor measurements from one or more sensors. For example, based on the presence detection, the high-power processor 20 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the high-power processor 20 may initiate an audio or visual indicator of where the person, animal or object is (either on the device itself or on a remote device via wired/wireless communication of information representative of where the person, animal or object is) or may initiate an alarm or security feature (either on the device itself or on the remote device) if an unrecognized person is detected under certain conditions (e.g., at night or when lights are off).

In some instances, devices may interact with each other such that events detected by a first device influences actions of a second device. For example, a first device can detect that a user has entered into a garage (e.g., by detecting motion in the garage, detecting a change in light in the garage or detecting opening of the garage door). The first device can transmit this information to a second device via the network interface 18, such that the second device can, e.g., adjust a home temperature setting, a light setting, a music setting, and/or a security-alarm setting. As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying) via a second device.

In addition to detecting various types of events, the device 10 may include a light source 26 that may illuminate when a living being, such as a human, is detected as approaching. The light source 26 may include any type of light source, such as one or more light-emitting diodes, or the like. The light source 26 may be communicatively coupled to the high-power processor 20 and the low-power processor 22, which may provide a signal to cause the light source 26 to illuminate.

It should be appreciated that embodiments are not limited to the specific components or combination of components of device 10 as described with reference to FIG. 1. Rather, embodiments include a variety of combinations as would be recognized by one skilled in the art in view of the current disclosure. For example, some embodiments may exclude the low power processor 22, the sensors 12, the light source 26, and/or the network interface 18. Further, in some embodiments the functionality of different components of device 10 as described with reference to FIG. 1 may be combined into new components or separated into multiple components. For example, in some embodiments the functionality described with reference to the low power processor 22 and high power processor 20 may be performed by a single processor.

Figure 2:
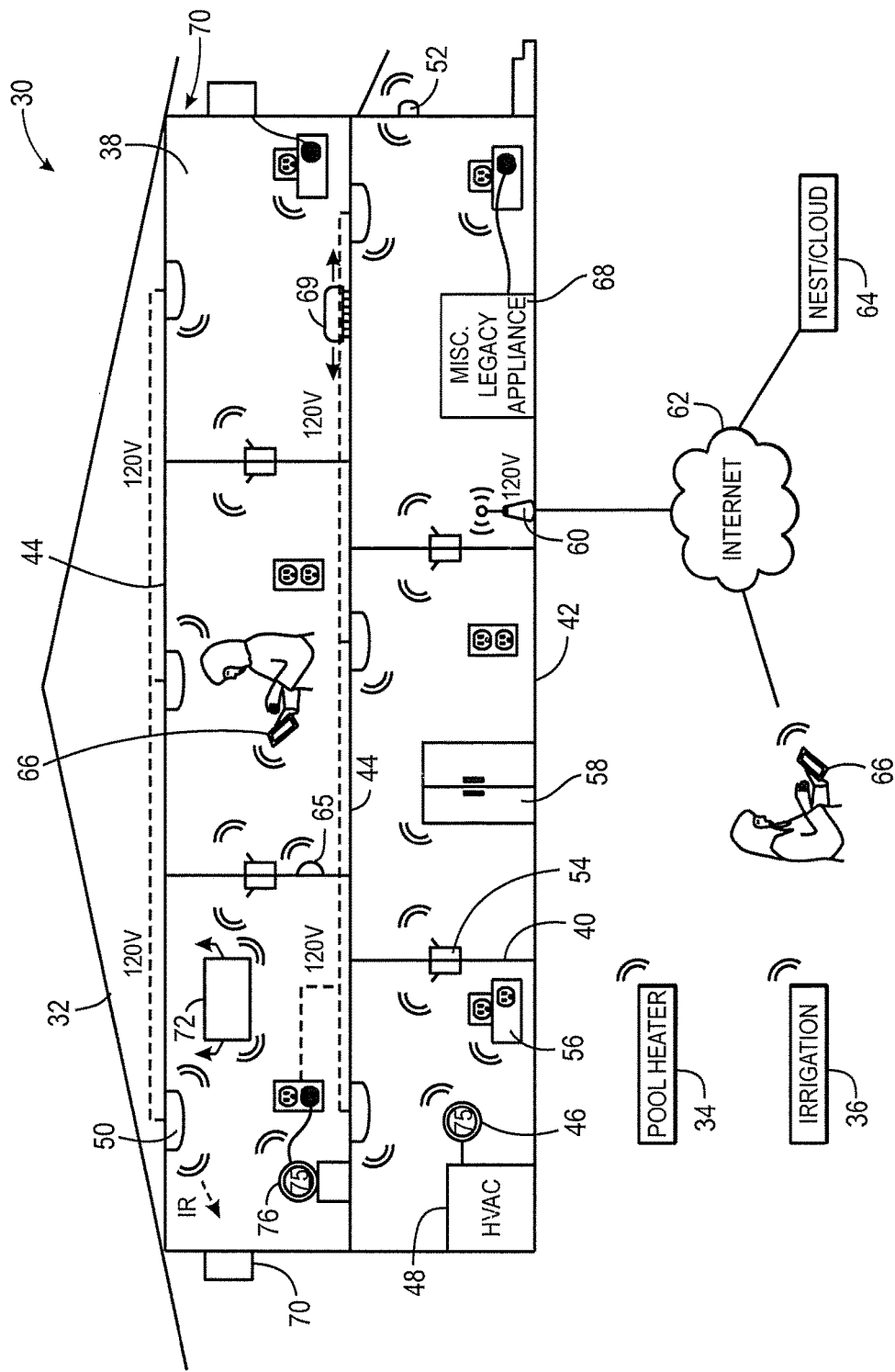
FIG. 2 illustrates a block diagram of a smart-home environment in which the general device of FIG. 1 may communicate with other devices via a network layer protocol, in accordance with an embodiment.

Keeping the foregoing in mind, FIG. 2 illustrates an example of a smart-home environment 30 within which one or more of the devices 10 of FIG. 1, methods, systems, services, and/or computer program products described further herein can be applicable. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment can control and/or be coupled to devices outside of the actual structure 32. Indeed, several devices in the smart home environment need not physically be within the structure 32 at all. For example, a device controlling a pool heater or irrigation system can be located outside of the structure 32.

The depicted structure 32 includes a number of rooms 38, separated at least partly from each other via walls 40. The walls 40 can include interior walls or exterior walls. Each room can further include a floor 42 and a ceiling 44. Devices can be mounted on, integrated with and/or supported by a wall 40, floor 42 or ceiling 44.

In some embodiments, the smart-home environment 30 of FIG. 2 includes a number of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), and one or more intelligent, multi-sensing, network-connected entryway interface devices 52 (hereinafter referred to as "smart doorbells 52"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly.

The smart hazard detector 50 may detect the presence of a hazardous substance or a substance indicative of a hazardous substance (e.g., smoke, fire, or carbon monoxide). The smart hazard detector 50 may include a Nest® Protect that may include sensors 12 such as smoke sensors, carbon monoxide sensors, and the like. As such, the hazard detector 50 may determine when smoke, fire, and/or carbon monoxide may be present within the building.

The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come). The smart doorbell 52 may interact with other devices 10 based on whether someone has approached or entered the smart-home environment 30.

In some embodiments, the smart-home environment 30 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further includes a number of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and new houses. For example, the devices 10 may be designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a back room or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices outside of the physical home but within a proximate geographical range of the home. For example, the smart-home environment 30 may include a pool heater monitor 34 that communicates a current pool temperature to other devices within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. As such, the device 10 may include a number of components or machines that could be implemented in environments outside of the smart-home environment 30. In addition to the examples provided above, the device 10 may also include a vehicle, a component (e.g., robot) in a vehicle (e.g., emergency services), a streetlight, and the like.

According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices of FIG. 2 can further allow a user to interact with the device even if the user is not proximate to the device. For example, a user can communicate with a device using a computer (e.g., a desktop computer, laptop computer, or tablet) or other portable electronic device (e.g., a smartphone) 66. A web page or app can be configured to receive communications from the user and control the device based on the communications and/or to present information about the device's operation to the user. For example, the user can view a current setpoint temperature for a thermostat and adjust it using a computer. The user can be in the structure during this remote communication or outside the structure.

As discussed, users can control the smart thermostat and other smart devices in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device as being associated with the home and to give permission to the occupant to use the device to control the smart devices in the home. An occupant can use their registered device 66 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment "learns" who is an occupant and permits the devices 66 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls will not permit the guest to adjust the heat-pump lockout temperature.

A use case example of this is when a guest is in a smart home, the guest could walk up to the thermostat and turn the dial manually, but the guest may not want to walk around the house "hunting" for the thermostat, especially at night while the home is dark and others are sleeping. Further, the guest may not want to go through the hassle of downloading the necessary application to their device for remotely controlling the thermostat. In fact, the guest may not have the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface for the particular smart device they choose.

According to embodiments, a guest layer of controls may also be provided to users by means other than a device 66. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques described in other sections of this application. In operation, when a person who does not live in the home or is otherwise not registered with the smart home or whose fingerprint or signature is not recognized by the smart home "walks up" to a smart device, the smart device provides the guest with the guest layer of controls, rather than full controls.

As described below, the smart thermostat 46 and other smart devices "learn" by observing occupant behavior. For example, the smart thermostat learns occupants' preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 60. The smart devices can further communicate with each other via a connection to a network, such as the Internet 62. Through the Internet 62, the smart devices can communicate with a central server or a cloud-computing system 64. The central server or cloud-computing system 64 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals).

According to embodiments, the smart devices combine to create a mesh network of spokesman and low-power nodes in the smart-home environment 30, where some of the smart devices are "spokesman" nodes and others are "low-powered" nodes. Some of the smart devices in the smart-home environment 30 are battery powered, while others have a regular and reliable power source, such as by connecting to wiring (e.g., to 120V line voltage wires) behind the walls 40 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 30 as well as with the central server or cloud-computing system 64. On the other hand, the devices that are battery powered are referred to as "low-power" nodes. These nodes tend to be smaller than spokesman nodes and can only communicate using wireless protocols that require very little power, such as Zigbee, 6LoWPAN, etc. Further, some, but not all, low-power nodes are incapable of bidirectional communication. These low-power nodes send messages, but they are unable to "listen". Thus, other devices in the smart-home environment 30, such as the spokesman nodes, cannot send information to these low-power nodes.

As described, the smart devices serve as low-power and spokesman nodes to create a mesh network in the smart-home environment 30. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-home environment 30 as well as over the Internet 62 to the central server or cloud-computing system 64. According to embodiments, the mesh network enables the central server or cloud-computing system 64 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment, as well as to other spokesman nodes that did not receive the commands directly from the central server or cloud-computing system 64.

An example of a low-power node is a smart night light 65. In addition to housing a light source, the smart night light 65 houses an occupancy sensor, such as an ultrasonic or passive IR sensor, and an ambient light sensor, such as a photoresistor or a single-pixel sensor that measures light in the room. In some embodiments, the smart night light 65 is configured to activate the light source when its ambient light sensor detects that the room is dark and when its occupancy sensor detects that someone is in the room. In other embodiments, the smart night light 65 is simply configured to activate the light source when its ambient light sensor detects that the room is dark. Further, according to embodiments, the smart night light 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors to the other devices and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart night light 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the devices 10 may be incapable of communicating with each other. Therefore, as discussed in detail below, the present techniques provide network communication jamming attack detection and notification solutions to such a problem.

In some embodiments, the mesh network can be used to automatically turn on and off lights as a person transitions from room to room. For example, the low-powered and spokesman nodes detect the person's movement through the smart-home environment and communicate corresponding messages through the mesh network. Using the messages that indicate which rooms are occupied, the central server or cloud-computing system 64 or some other device activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart night light 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 50 detects smoke and activates an alarm), the central server or cloud-computing system 64 or some other device uses occupancy information obtained from the low-powered and spokesman nodes to determine which rooms are occupied and then turns on lights (e.g., nightlights 65, wall switches 54, wall plugs 56 that power lamps, etc.) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, serving as a localized and mobile occupancy detection device, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor, a processor, an occupancy detector, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot (s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 2) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment (including any occupancy sensing equipment located on the robot itself) for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 2. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a number of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 30 that happens to be closest to the occupant when the occupant falls asleep will be the device that transmits messages regarding when the occupant stopped moving, from which the central server or cloud-computing system 64 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment to identify such patterns.

Figure 3:
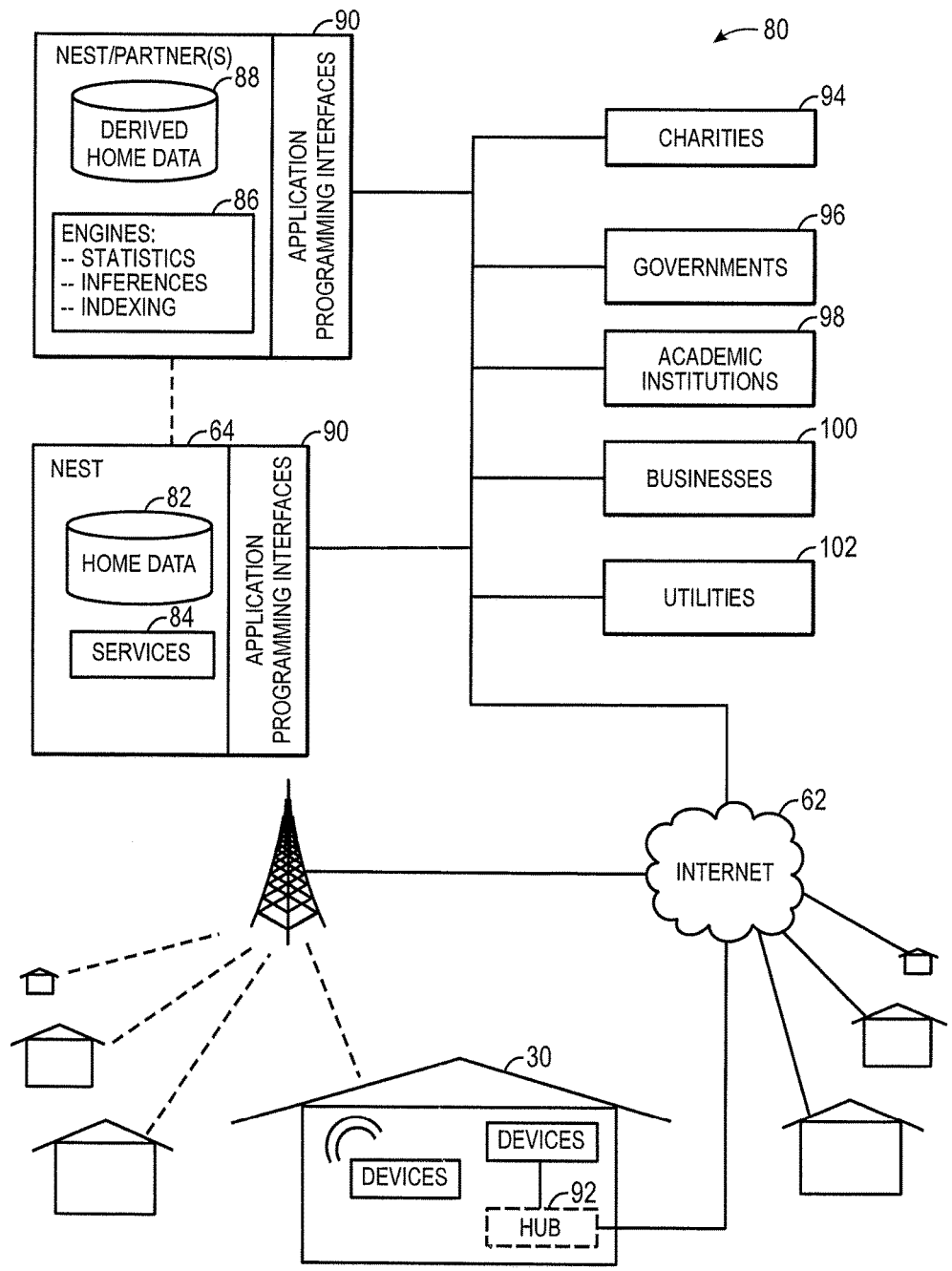
FIG. 3 illustrates a network-level view of an extensible devices and services platform with which the smart-home environment of FIG. 2 can be integrated, in accordance with an embodiment.

In addition, FIG. 3 illustrates an embodiment of an extensible devices and services platform 80 that can be concentrated at a single server or distributed among several different computing entities without limitation with respect to the smart-home environment 30. The extensible devices and services platform 80 may include a processing engine 86, which may include engines that receive data from devices of smart-home environments (e.g., via the Internet or a hubbed network), to index the data, to analyze the data and/or to generate statistics based on the analysis or as part of the analysis. The analyzed data can be stored as derived home data 88.

Results of the analysis or statistics can thereafter be transmitted back to the device that provided home data used to derive the results, to other devices, to a server providing a web page to a user of the device, or to other non-device entities. For example, use statistics, use statistics relative to use of other devices, use patterns, and/or statistics summarizing sensor readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device usage across a population of devices and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps, that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
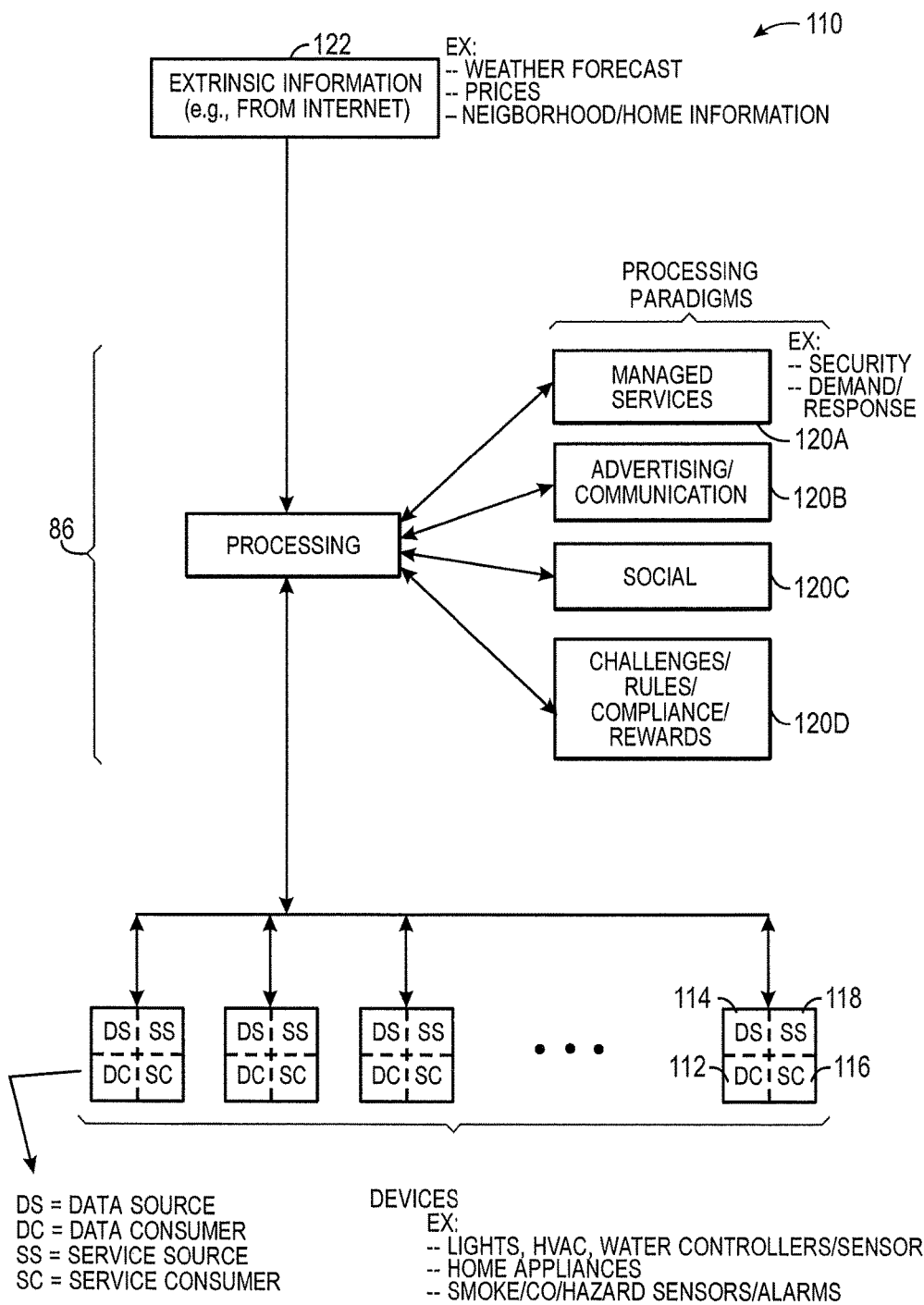
FIG. 4 illustrates an abstracted functional view of the extensible devices and services platform of FIG. 3, with reference to a processing engine as well as devices of the smart-home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices situated in smart-home environments will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices to achieve their local and immediate objectives, the extensible devices and services platform 80 can also be configured to harness the large amount of data that is flowing out of these devices. In addition to enhancing or optimizing the actual operation of the devices themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Improved Human Detection by Smart Device

Figure 5:
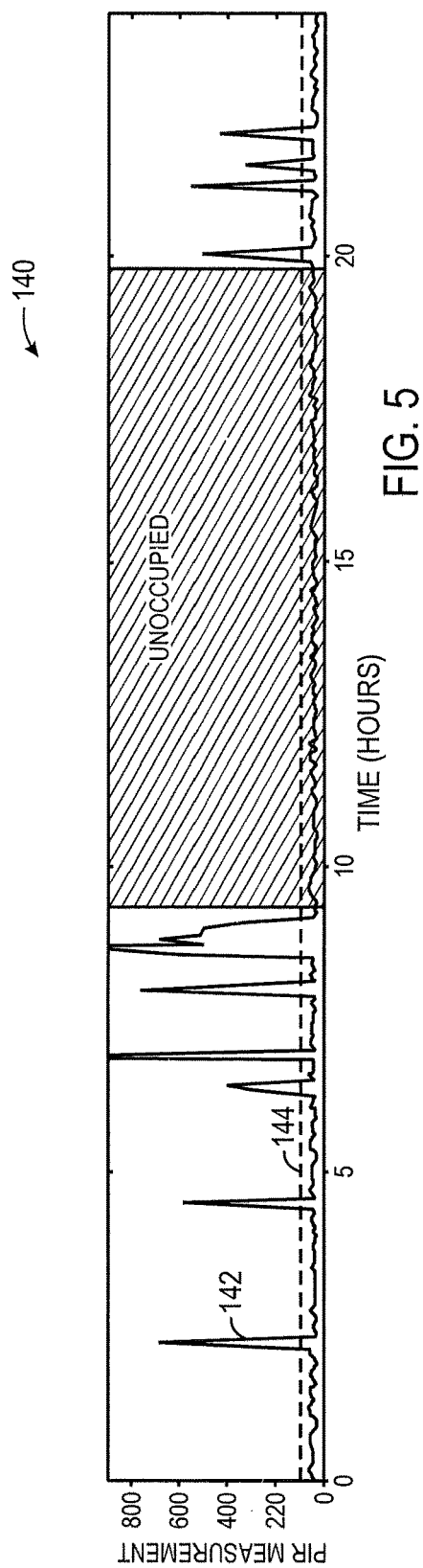
FIG. 5 illustrates a graph of sensor measurements associated with PIR sensors and a threshold associated with detecting a presence of a human being, in accordance with an embodiment.

Referring now back to the PIR sensor 24 of FIG. 1, in certain embodiments, the device 10 may use the PIR sensor 24 to detect the presence of a living being, such as a human or any other being (e.g., animal, insect, etc.). For instance, FIG. 5 illustrates a graph 140 of sensor measurements 142 associated with one PIR sensor 24 and a static PIR sensor threshold 144 that is used to indicate whether a monitored space is occupied or unoccupied. Generally, the low power processor 22 may monitor the sensor measurements 142 with respect to the static PIR sensor threshold 144 over a certain period of time (e.g., 15 minutes). If the low power processor 22 detects a measurement above the static PIR sensor threshold 144 within the period of time, the low power processor 22 may designate the space being monitored as "occupied" or having the presence of a living being. If, however, the low power processor 22 detects a measurement below the static PIR sensor threshold 144 for the entire duration of the period of time, the low power processor 22 may designate the space being monitored as "unoccupied" or not having a living being.

Keeping this in mind and referring to FIG. 5, the measurements 142 above the static PIR sensor threshold 144 may be associated with the presence of a living being. However, during the unoccupied period of time (i.e., 9 to 19 hours), the measurements 142 do not exceed the static PIR threshold 144 for an extended period of time. In certain embodiments, every individual PIR sensor 24 that may be part of one or more devices 10 may use the same static PIR sensor threshold 144 to detect the presence of a human being. Although the static PIR sensor threshold 144 may work well for detecting the presence of a being for one particular PIR sensor 24, the same threshold 144 may be less optimal for detecting the presence via another PIR sensor 24. That is, the individual noise profile for each PIR sensor 24 may cause certain PIR sensors 24 (e.g., those sensors that output relatively high sensor values) to trigger an occupied state in response to the presence of an animal (e.g., pet) or other noise source that may cause the output sensor value to exceed the static PIR threshold 144, thereby falsely detecting the presence of a human, while causing other PIR sensors 24 (e.g., those sensors that output relatively low sensor values) to suboptimally delay triggering of an occupied state in response to the presence of a human.

For instance, FIG. 6 illustrates measurements 142 that exceed the static PIR sensor threshold 144 by a small margin. Since these measurements exceed the static PIR sensor threshold 144, the low power processor 22 may assume that the space being monitored includes the presence of a living being. However, these measurements that barely exceed the static PIR sensor threshold 144 are likely false detections of living beings. That is, the presence of a living being may typically correspond to measurements that are well over the static PIR sensor threshold 144.

Moreover, the measurements that just exceed the static PIR sensor threshold 144 may also cause the low power processor 22 to detect the presence of the living being too early. By way of example, FIG. 7 illustrates one measurement 145 that just exceeds these measurements exceed the static PIR sensor threshold 144. This one measurement 145 may cause the low power processor 22 to detect the presence of the living too early, thereby causing the low power processor 22 to take action (e.g., illuminate the light source 26) before the living being is positioned at a desired location.

Figure 8:
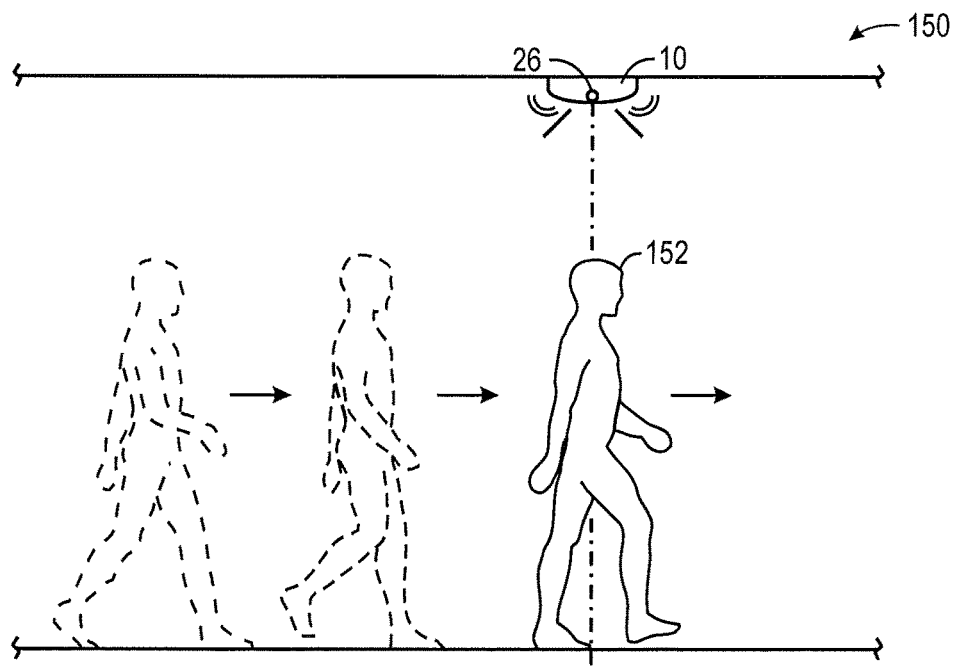
FIGS. 8 and 9 illustrate examples of when the general device of FIG. 1 may detect a presence of a human, in accordance with an embodiment.

For instance, the device 10 may use the PIR sensor 24 to determine when to illuminate a light source 26. Keeping this in mind, FIG. 8 depicts an example 150 of when the device 10 detects the presence of a human 152 when the human is directly inline with the device 10. However, by accounting for the noise sensitivity characteristics of each PIR sensor 24 using the techniques described herein to adjust the static PIR sensor threshold 144 for each PIR sensor 24, the device 10 may detect the presence of the human 152 before the human 152 is directly inline with the device 10. In some instances, the device 10 may detect the presence of the human 152 approaching the device 10 when the human 152 is up to four feet away from being directly inline with the PIR sensor 24 or up to one second before the human is directly inline with the PIR sensor 24, as shown in example 160 of FIG. 9. In this manner, the light source 26 may illuminate a path for the human 152 as the human 152 approaches the device 10, thereby assisting the human 152 journey through the dark corridors of the smart home environment 30 during late hours in the night.

Figure 9:
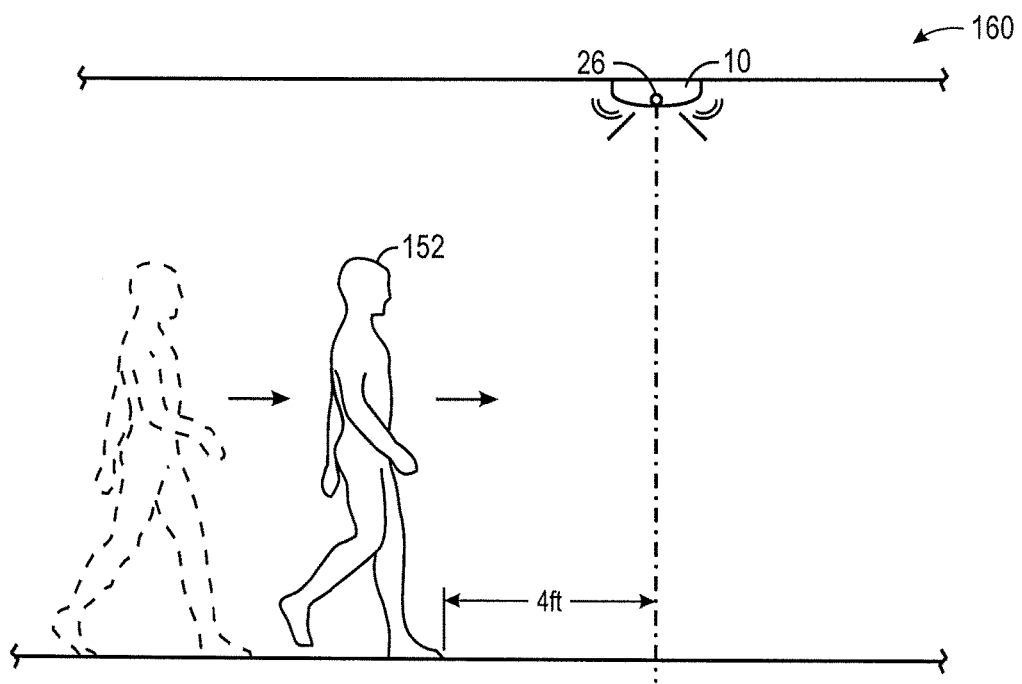

It should be noted that not all PIR sensors 24 may experience the delayed illumination of the light source depicted in FIG. 9. Rather, certain PIR sensors 24 that are less susceptible to noise may not receive an indication or measurement above the static PIR sensor threshold 144 until the living being is closer to the respective PIR sensor 24 as compared to other PIR sensors 24 that may be more susceptible to noise. Moreover, any PIR sensor 24 may become more or less sensitive to noise over a relatively short period of time due to temperature variations and over longer periods of time due to issues such as sensor degradation, changes in battery voltage, etc.

Figure 10:
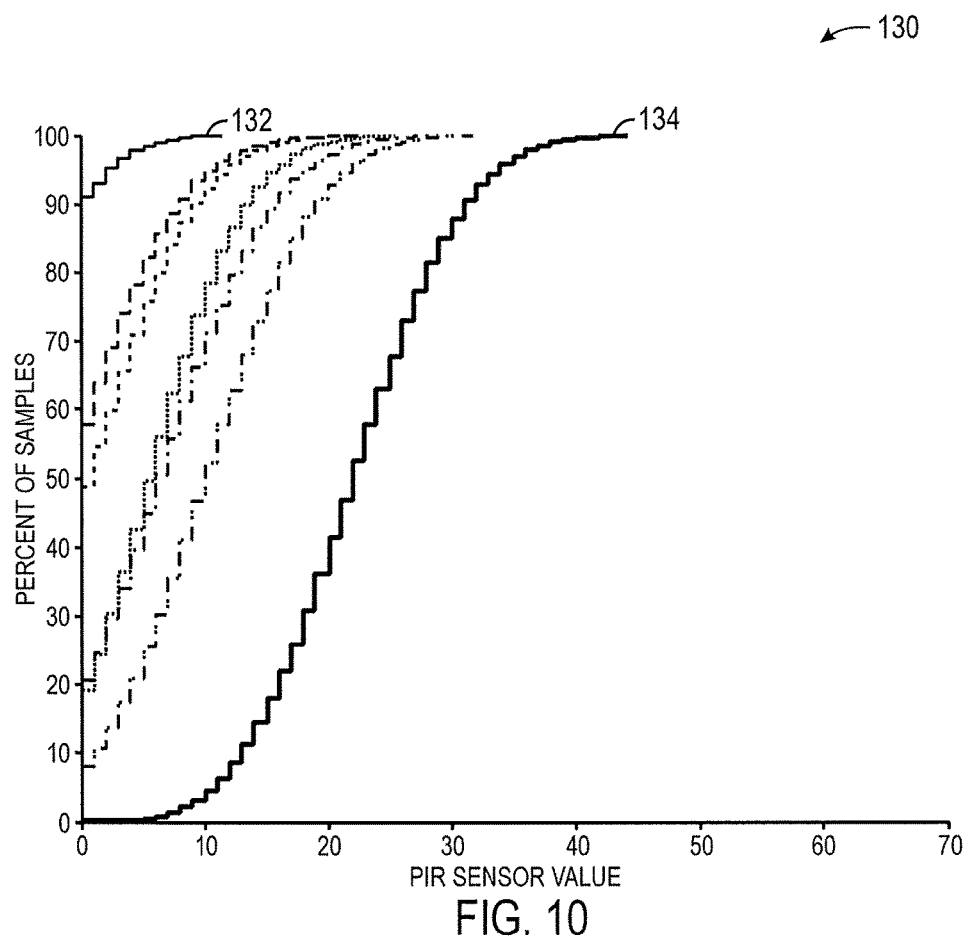
FIG. 10 illustrates a graph of cumulative distributions of noise for different passive infrared (PIR) sensors that may be part of the general device of FIG. 1, in accordance with an embodiment.
Figure 11:
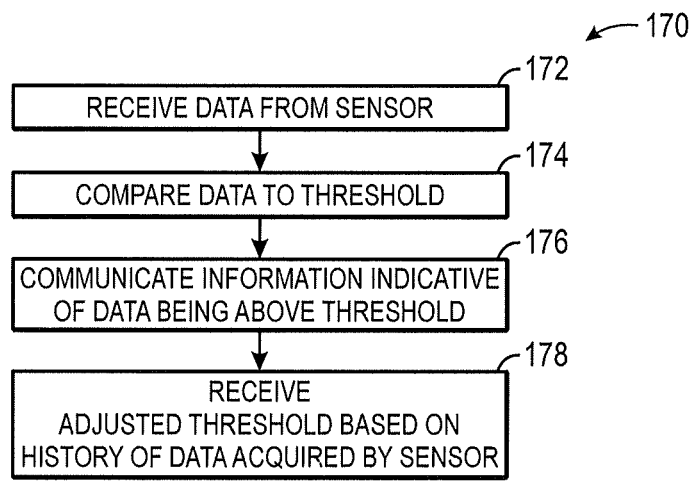
FIG. 11 illustrates a flow chart of a method for adjusting a threshold for detecting the presence of a human based on PIR sensor measurements, in accordance with an embodiment.

Additionally, each individual PIR sensor 24 may inherently be sensitive to different types and levels of noise. That is, the peak noise detections by each individual PIR sensor 24 (with respect to multiple PIR sensors within a single device and/or individual PIR sensors distributed across multiple devices) may vary significantly for each PIR sensor 24 due to manufacturing tolerances, ambient conditions, etc. By way of example, FIG. 10 illustrates a graph 130 of cumulative distributions of noise for different PIR sensors 24 that may be part of a device(s) 10. As shown in FIG. 10, different PIR sensors may differ in noise sensitivity by a relatively large amount. For instance, measurements from a first PIR sensor 132 may reach a peak PIR sensor value of 10 for noise while measurements from a second PIR sensor 134 may reach a peak PIR sensor value of 40 for noise.

Although each individual PIR sensor 24 may have different noise sensitivity profiles, in some devices 10, one common PIR sensor threshold value may be used across the devices 10 for evaluating whether a space lacks the presence of a human (i.e., "unoccupied") or includes the presence of a human (i.e., "occupied"). Accordingly, since each individual PIR sensor 24 may have different noise sensitivity profiles, and since each PIR sensor 24 may be affected by temperature variations and other factors that may influence its noise sensitivity levels, it may be beneficial to dynamically adapt or adjust the PIR sensor threshold 144 for each individual PIR sensor 24 using techniques described herein.

In one embodiment, to better account for the noise sensitivities for each individual PIR sensor 24, the device 10 may employ a method 170 for adjusting a threshold associated with detecting the presence of a human based on PIR sensor measurements. Although the following description of the method 170 is being discussed with the respect to the PIR sensor measurements of the PIR sensor 24, it should be noted that the method 170 and other techniques described herein may be employed using data from any type of sensor 12 that may be part of the device 10. Moreover, although the following descriptions of methods to detect the presence of humans is discussed with respect to humans, it should be noted that the techniques described herein may be used to detect the presence of other objects such as animals in the wild for migration pattern studies, rodents in grocery aisles, and the like.

The method 170 may describe the general process employed by the device 10 to adjust thresholds associated with various measurements acquired by various sensors. At block 172, a processor in the device 10 may receive data from the sensor 12. As mentioned above, the data may be acquired by any type of sensor 12 that may be part of the device 10.

At block 174, the processor may compare the data to a threshold associated with the data. If the data exceeds the threshold, at block 176, the processor may communicate information indicating that the data exceeds the threshold to another processor within the same device, to another device 10, a data storage unit, or the like via a wired or wireless transmission.

At block 178, the processor may receive an adjusted threshold to compare the data received at block 172. In general, the adjusted threshold may be determined by first determining a noise floor level of the measurements acquired by the sensor 12 when a space being monitored by the sensor 12 is determined to be unoccupied. The noise floor level may be determined based on the mean of the measurements. Next, a standard or absolute deviation of the measurements acquired by the sensor 12 may be determined. The updated threshold may then be determined as being a number (e.g., 8) of standard or absolute deviations away from the noise floor or mean of the measurements.

Keeping the foregoing in mind, the process described in the method 170 may be distributed between the low-power processor 22 and the high-power processor 20. That is, the low-power processor 22 may be used to monitor certain conditions regarding a physical space and the high-power processor 20 may be used to perform various calculations (e.g., threshold adjustments) that may involve more energy as compared to the monitoring operations performed by the low-power processor 22. In this way, the device 10 may use its available energy more efficiently.

Figure 12:
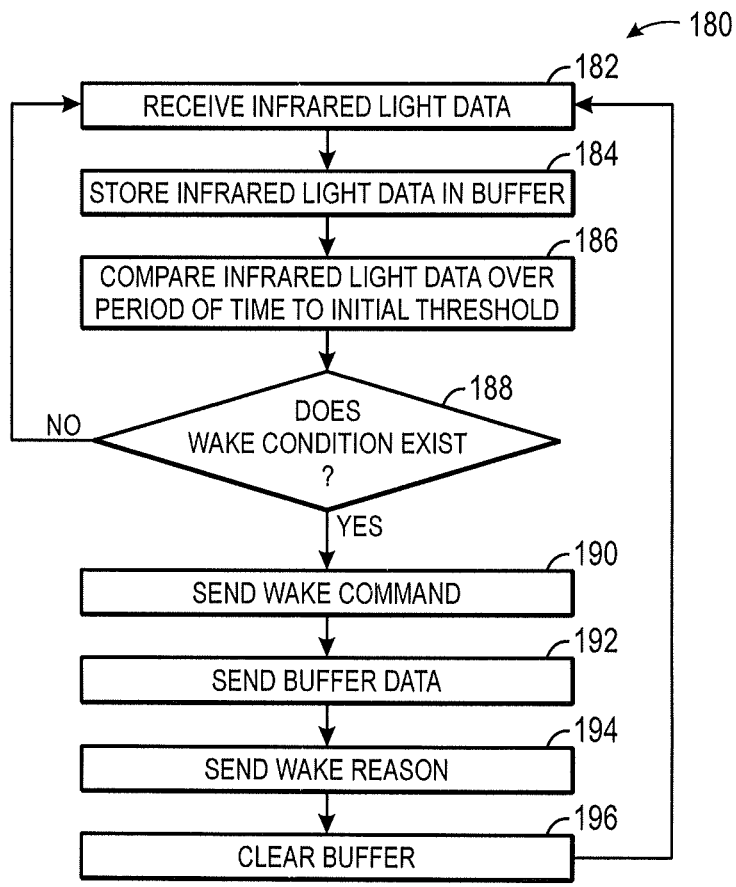
FIG. 12 illustrates a flow chart of a method that a low-power processor in the general device of FIG. 1 may employ when adjusting the threshold for detecting the presence of a human based on PIR sensor measurements, in accordance with an embodiment.

In one embodiment, FIG. 12 illustrates a method 180 that the low-power processor 22 may employ when monitoring a physical space. At block 182, the low-power processor 22 may receive infrared light data from the PIR sensor 24. The infrared light data may include raw measurements from the PIR sensor 24. In one embodiment, the raw measurements may represent a change in an infrared radiation detected in a space within a sensing range of the PIP, sensor 24.

At block 184, the low-power processor 22 may store the infrared light data acquired by the PIR sensor 24 in a buffer.

The buffer may be a first-in-first-out (FIFO) buffer. As such, the buffer may include a limited amount of memory that may be sufficient to store the infrared light data over some period of time (e.g., 30 minutes).

At block 186, the low-power processor 22 may compare the infrared light data (e.g., PIR sensor measurements) to an initial threshold and determine whether the infrared light data exceeds an initial threshold over a certain period of time in which the monitored space is designated as a unoccupied. The initial threshold may be determined based on the type of PIR sensor 24 being used, various expected noise conditions associated with the smart home environment 30 (e.g., if noise is regularly expected due to the presence of a train near the house), and the like. In one embodiment, the initial threshold may be programmed into the device 10 at the time of manufacturing. Alternatively, the device 10 may perform a learning operation that monitors its environment, receives input from a user verifying unoccupied versus occupied periods of time, and determine the initial threshold using similar techniques described herein.

At block 188, the low-power processor 22 may determine whether a condition (e.g., wake condition) has been detected that may cause the low-power processor 22 to wake the high-power processor 20, which may be operating in a sleep or low power mode. For instance, when the infrared light data exceeds the initial threshold during a period of time identified as be unoccupied, low-power processor 22 may determine that the physical space within the sensing range of the PIR sensor 24 may include the presence of a human. In one embodiment, the detection of the presence of the human during the unoccupied period may be a wake condition. In another embodiment, the wake condition may correspond to when the buffer of the low-power processor 22 is full. Wake conditions may also correspond to when a hazard (e.g., smoke, fire, carbon monoxide) is detected.

If the wake condition does not exist at block 188, the low-power processor 22 may return to block 182. If, however, the wake condition exists, the low-power processor 22 may proceed to block 190. At block 190, the low-power processor 22 may send a wake command to the high-power processor 20. The wake command may cause the high-power processor 20 to exit from operating in its sleep or low power mode and begin performing various operations that may be computationally more complex or may use more energy as compared to the operations of the low-power processor 22.

In addition to the sending the wake command, at block 192, the low-power processor 22 may send the buffer data that includes the stored infrared light data received at block 182. In certain embodiments, the high-power processor 20 may use the buffer data to adjust the initial threshold as will be described in greater detail below.

At block 194, the low-power processor 22 may send a reason that the wake condition exists at block 188. That is, the low-power processor 22 may send data related to the condition that caused the low-power processor 22 to determine that the wake condition was present. For instance, the low-power processor 22 may send data related to a smoke alarm detected that may include a time at which the smoke was detected, a location or device 10 that detected the smoke, and the like.

After sending various types of data to the high-power processor 20, the low-power processor 22 may, at block 196, clear the buffer that stores the infrared light data and return to block 182. As such, the low-power processor 22 may continue operating to monitor the corresponding physical space for wake conditions and continue receiving the infrared light data to determine whether a human is present in the space.

Figure 13:
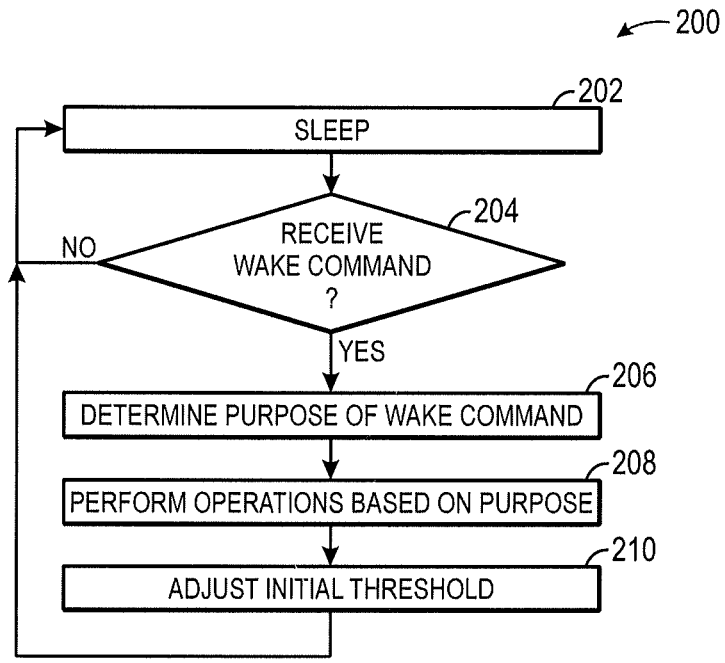
FIG. 13 illustrates a flow chart of a method that a high-power processor in the general device of FIG. 1 may employ when interacting with the low-power processor in the general device of FIG. 1, in accordance with an embodiment.

Keeping the foregoing in mind, FIG. 13 illustrates a method 200 that the high-power processor 20 may employ upon receiving the wake command from the low-power processor 22, as described above in the method 180. At block 202, the high-power processor 20 may operate in a sleep or low-power mode. As such, the high-power processor 20 may perform few tasks to preserve energy.

At block 204, the high-power processor 20 may determine whether it received a wake command. In one embodiment, the high-power processor 20 may periodically exit its sleep mode to determine whether a wake condition exists or whether the low-power processor 22 attempted to wake the high-power processor 20.

At block 206, the high-power processor 20 may determine the purpose of the wake command. As mentioned above with regard to the method 180, the low-power processor 22 may send a reason or data regarding a reason that the wake command was sent. For example, the wake command may correspond to the detection of smoke by a hazard detector device.

Upon determining the purpose of the wake command, the high-power processor 20 may, at block 208, perform various operations based on the purpose of the wake command received at block 206. Referring back to the example provided above, the high-power processor 20 may send a notification to an alarm company, a fire department, or the like indicating the detected presence of smoke by the hazard detector.

In one embodiment, at block 210, the high-power processor 20 may adjust the initial threshold that corresponds to the detection of the presence of a human during unoccupied periods of time. As such, block 210 may be performed at every instance that the wake command has been received. Alternatively, block 210 may be performed each time the buffer for storing the infrared light data is received. In yet another embodiment, block 210 may be performed at regular intervals during the day, week, month, or year, at regular intervals during known unoccupied periods of time, or the like. Moreover, block 210 may be performed based on a command received from the high-power processor 20, a user of the device 10, a predetermined time schedule, or the like.

Figure 14:
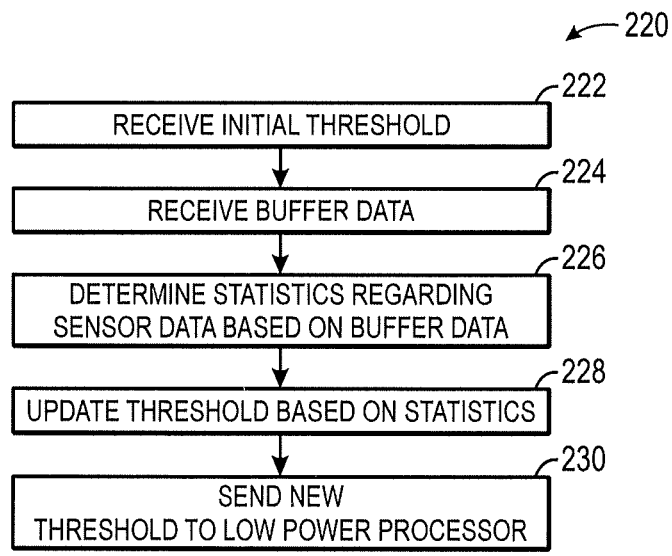
FIG. 14 illustrates a flow chart of a method that a high-power processor in the general device of FIG. 1 may employ when adjusting the threshold for detecting the presence of a human based on PIR sensor measurements, in accordance with an embodiment.

Keeping this in mind, FIG. 14 illustrates a method 220 that the high-power processor 20 may employ when determining the adjusted threshold for detecting human presence at block 210. As such, at block 222, the high-power processor 20 may receive the current or initial threshold being used by the low-power processor 22 to detect the presence of a human during periods of time that are designated as being unoccupied.

At block 224, the high-power processor 20 may receive the buffer data that includes the measurements acquired by the PIR sensors 24 from the low-power processor 22. The high-power processor 20 may then, at block 226, determine various statistics associated with the measurements recording in the buffer data. The high-power processor 20 is configured to receive a second set of data acquired by the PIR sensors 24, and send a second signal to the low-power processor 22 to store the first set of data when none of one or more measurements of the second set of data exceeds an initial threshold over a period of time. Generally, the high-power processor 20 may remove outlier values from the data stored in the buffer and compute a mean and standard deviation of the remaining data. The mean of the remaining data may represent a noise floor of the measurements associated with the respective PIR sensor 24. The standard deviation may be used to set the new threshold for detecting human presence using the low-power processor 22.

In certain embodiments, instead of calculating the standard deviation, the high-power processor 20 may calculate a mean absolute deviation of the remaining data to conserve the processing power used by the high-power processor 20. That is, the mean absolute deviation may include calculating absolute differences between each value of the data stored in the buffer and then determining the mean of the absolute differences (i.e., mean absolute deviation). Like the standard deviation mentioned above, the mean absolute deviation may be used to set the new threshold for detecting human presence using the low-power processor 22. By determining the absolute mean differences, the high-power processor 20 may determine an approximate deviation from the mean of the data in the buffer without using complex mathematical functions (e.g., square root). As a result, the high-power processor 20 may determine a deviation amount from the mean of the data in the buffer more using less processing power than what may be used when calculating the standard deviation of the data in the buffer.

At block 228, the high-power processor 20 may update the threshold for detecting the presence of a human using the standard deviation or the mean absolute deviation mentioned above. That is, the high-power processor 20 may set the threshold for detecting the presence of a human a number of standard deviations (e.g, 8) from the mean. Alternatively, the high-power processor 20 may set the threshold for detecting the presence of a human a number of mean absolute deviations (e.g, 10) from the mean of the remaining data.

After determining the new threshold, the high-power processor may, at block 230, send the new threshold to the low-power processor 22. Here, the low-power processor 22 may then use the new threshold to detect the presence of a human, as mentioned above with reference to FIG. 12. As such, each device 10 may better predict when a human is present in a respective space by accounting for the noise sensitivity characteristics of the respective PIR sensor 24.

In addition to better predicting when a human is present, the low-power processor 22 may detect the presence of a human sooner (e.g., up to one second earlier) using the new threshold. As a result, the light source 26 may be illuminated earlier or before the human is directly inline with the device 10. In some cases, the low-power processor 24 may detect the presence of the human up to four feet before the human is inline with the device 10.

Upon receiving the new threshold from the high-power processor 20, the low-power processor 22 may set the threshold it uses to detect the presence of a human to the new threshold. Since the new threshold is determined based on the infrared light data acquired by the PIR sensor 24 when a human was unlikely in the presence of the PIR sensor 24, the new threshold may account for the noise sensitivity characteristics of the respective PIR sensor 24.

Further, by determining the new threshold during a time period in which a human is not detected by the PIR sensor 24, the high-power processor 20 may adjust the initial threshold based on the noise sensitivity characteristics of the respective PIR sensor 24 receiving the infrared light data. That is, when a human is not present in the space monitored by the PIR sensor 24, the infrared light data received by the PIR sensor 24 may more likely be affected by noise since a large object, such as a human, is not drastically changing the levels of the infrared light detected by the PIR sensor 24. Rather, the sensitivity characteristics of the PIR sensor 24 may be represented better during the time period when a human does not occupy the space associated with the respective PIR sensor 24.

Generally, the noise sensitivity characteristics or the amount of noise received by a particular PIR sensor 24 is not static. Instead, the noise sensitivity characteristics for each respective PIR sensor 24 change gradually over time. In some instances, the noise sensitivity characteristics for each respective PIR sensor 24 may be related to temperature. For example, the data received by the PIR sensor 24 is inversely proportional to temperature. As such, the threshold for a respective PIR sensor 24 should decrease when the respective PIR sensor 24 is in an environment where the temperature increases. In any case, by continuously determining a new threshold for detecting the presence of a human, the high-power processor 20 may improve its accuracy in detecting the presence of a human and may improve its rate at which it detects the presences of a human.

Figure 15:
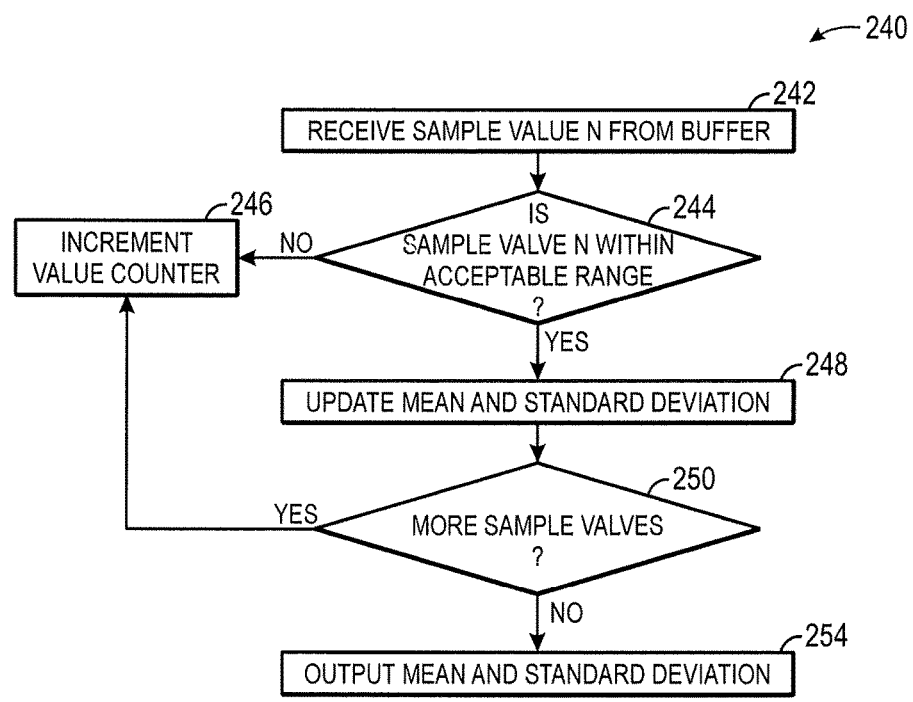
FIG. 15 illustrates a flow chart of a method for determining statistics based on PIR sensor measurements, in accordance with an embodiment.

Referring back to block 226, in certain embodiments, the high-power processor 20 may determine the statistics regarding the measurements in the buffer data using the method 240 of FIG. 15. Although the method 240 describes one embodiment in which the statistics regarding the measurement data may be determined, it should be understood that the statistics may be determined in a number of different manners and that FIG. 15 merely provides an example of one embodiment.

At block 242, the high-power processor 20 may receive a value N from the buffer data. That is, the high-power processor 20 may receive one value from the buffer data provided to the high-power processor 20 by the low-power processor 22. At block 244, the high-power processor 20 may determine whether the value N is within a range of acceptable values.

If, the value N is not within the acceptable range at block 244, the high-power processor 20 may proceed to block 246 and increment a value counter by one. As such, the high-power processor 20 may skip or ignore the value N and prevent the value N from being used in its statistics regarding the buffer data. As such, the high-power processor 20 may remove outliers or extreme values that may be part of the buffer data from being calculated as part of the statistics of the buffer data.

If, however, the value N is within the acceptable range of values, the high-power processor 20 may proceed to block 248. At block 248, the high-power processor 20 may update a mean, a standard deviation, and/or an absolute mean deviation based on the value N. Initially, the high-power processor 20 may determine the mean, the standard deviation, or the absolute mean deviation based on just the value N. As the process of the method 240 continues, however, the mean, the standard deviation, and/or the absolute mean deviation may be determine based on multiple sample values from the buffer data.

In certain embodiments, the high-power processor 20 may update the mean, the standard deviation, and/or the absolute mean deviation according to a weight, such that the updated mean, standard deviation, and/or absolute mean deviation is determined according to:

$$\text{new value} = (\text{previous value } x) + (\text{new sample value}) \times (1-)$$

Keeping this in mind, the updated mean may be calculated according to:

$$\text{updated mean} = (\text{previously calculated mean } x) + (\text{new sample value}) \times (1-)$$

Although the updated mean, standard deviation, and/or absolute mean deviation is described as being determined using the equations described above, it should be understood that any temporal filter may be applied when determining the statistics associated with the buffer data.

After updating the mean, the standard deviation, and/or the absolute mean deviation based on the value N, the high-power processor 20 may proceed to block 250. At block 250, the high-power processor 20 may determine whether additional values are present in the buffer data. If additional values are present in the buffer data, the high-power processor 20 may proceed to block 246 and increment a value counter by one as described above. The high-power processor 20 may then return to block 242 and receive the next (N+1) value from the buffer data. The high-power processor 20 may then perform blocks 242-248 continuously until no other values are remaining in the buffer data. As such, the high-power processor 20 may output the mean, the standard deviation, and/or the absolute mean deviation determined at block 248. The high-power processor 20 may then use the mean, the standard deviation, and/or the absolute mean deviation output at block 254 may update the threshold as described above with reference to block 228 of FIG. 14.

In certain embodiments, the high-power processor 20 may receive additional information via the sensors 12 of the device 10 to assist in the determination of the threshold. For instance, the threshold may be adjusted further based on certain ambient conditions such as temperature, time of day, carbon dioxide, rain, ultrasonic waves, ambient light, or the like. Upon receiving this information, the high-power processor 20 may further adjust the threshold. For example, during the day or when a ambient light sensor detects an amount of ambient light that corresponds to daylight, the PIR sensor 24 may be more susceptible to noise. As such, the high-power processor 20 may further increase the threshold by some amount when the ambient light sensor receives measurements that are greater than some value (i.e., some value that corresponds to daylight). In the same manner, if the ambient light sensor detects an amount of ambient light (e.g., when the ambient light sensor receives measurements that are less than some value that corresponds to night) that corresponds to night, the high-power processor 20 may decrease the threshold by some amount. In another example, the high-power processor 20 may increase the threshold when the temperature of a space being monitored is above some value, when an amount of carbon dioxide is present in the space, if rain is occurring outside, and the like.

Figure 16:
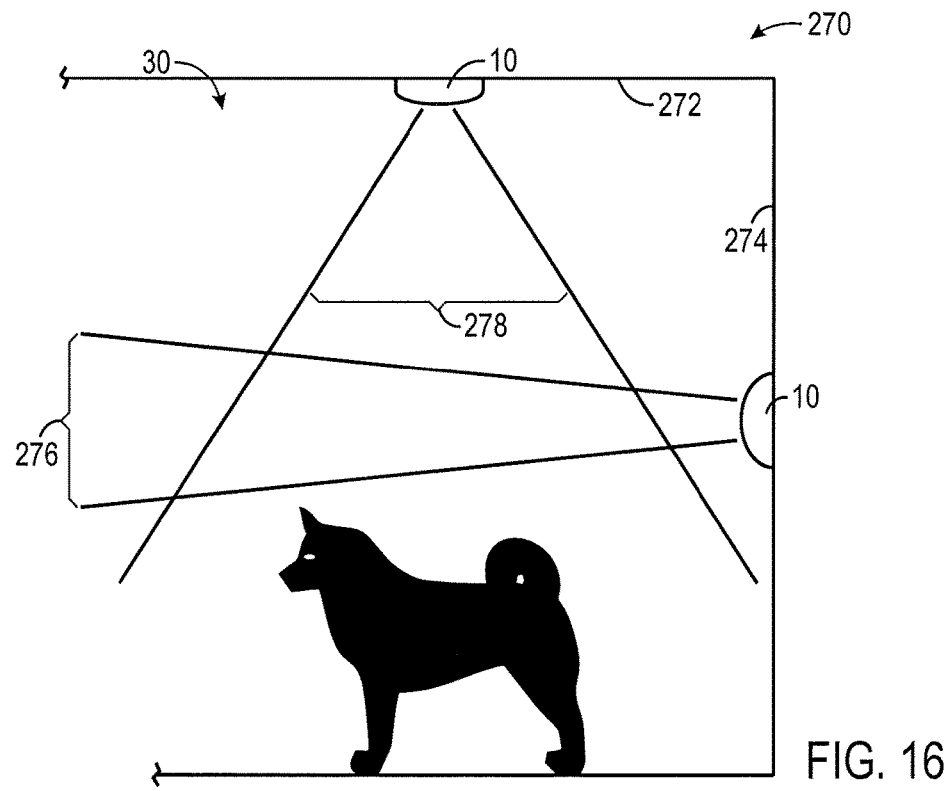
FIG. 16 illustrates a schematic diagram of sensor ranges for two types of general devices of FIG. 1, in accordance with an embodiment.

By repeatedly determining a dynamic occupancy threshold, the devices 10 may become more sensitive to various sources of noise in the home. In certain situations, this increased sensitivity could result in more false positives due to the detection of animals, such as pets, in the building. As such, different devices 10 may use different occupancy thresholds depending on their location in the building and/or the current occupancy status of the building. Keeping this in mind, FIG. 16 illustrates a schematic diagram 270 of sensor ranges for two types of devices 10 that may be disposed in the smart home environment 30. As shown in FIG. 15, one device 10 may be placed on the ceiling 272 and another device 10 may be placed on a wall 274. Based on the type of device 10 being used and the position of the device 10 within the smart home environment 30, each device 10 may use different thresholds to detect the presence of a human. Moreover, each device 10 may have different sensing ranges 276, 278.

Moreover, given the different possible positions of the device 10, it is possible, for example, that the device 10 on the ceiling 272 may detect the presence of an animal, while the device 10 on the wall 274 does not detect the same animal. As such, using a different threshold for detecting the presence of a human in each device 10 may enable the device 10 to better predict the presence of a human.

In certain smart home environments 30, the infrared light data associated with an animal, such as a pet, may be falsely interpreted by the device 10 as indicating the presence of a human. In other words, the threshold established by the high-power processor 20 may be too low since it may not be accounting for the presence of an animal. In one embodiment, the user of the device 10 may provide an input indicating that the smart home environment 30 may include an animal, such as a pet. In some embodiments, indication of the presence of a pet may be used to adjust the threshold for all of the devices 10 in or otherwise associate with an enclosure. In other embodiments, indication of the presence of a pet may be used to adjust the threshold for only a subset of the devices 10. For example, the threshold may be adjusted for only those devices which may have sensor ranges which may detect a pet. This may be based on a mounting arrangement (e.g., a device 10 mounted on a ceiling versus a device mounted on a wall), and/or based on a mounting location (e.g., in a room which a pet is expected to occupy at some point in time, such as a living room, vs a room which a pet is not expected to occupy, such as a bedroom).

Figure 17:
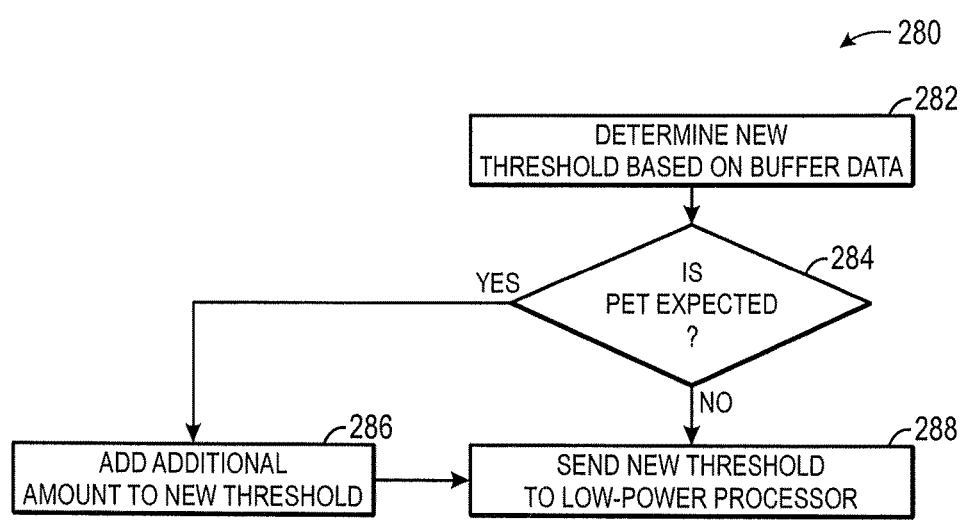
FIG. 17 illustrates a flow chart of a method for adjusting the threshold for detecting the presence of a human when a pet is expected to be present based on PIR sensor measurements, in accordance with an embodiment.

FIG. 17 illustrates a flow chart of a method 280 for adjusting the threshold for detecting the presence of a human when a pet is expected to be present. In one embodiment, the method 260 may be performed in addition to or in conjunction with the methods described above.

As shown in FIG. 17, the method 280 may begin after the high-power processor 20 determines the new threshold value at block 210 of the method 200. As such, at block 282, the high-power processor 20 may determine whether a pet is expected to be present in the smart home environment 30. In one embodiment, a user of the device 10 may specify to the device 10 that the user has a pet. The user may specify this information to the device 10 when the device 10 is first installed, when prompted by the device 10, or at any other time.

If the high-power processor 20 received an input indicating that a pet is expected to be present, the high-power processor 20 may proceed to block 284. At block 284, the high-power processor 20 may add some additional amount to the new threshold calculated at block 210. The additional amount may be determined to be sufficient to prevent infrared light data to be interpreted as being associated with a human when it actually corresponds to a pet, while still accurately detecting the presence of a human.

After adding the additional amount to the new threshold, the high-power processor 20 may proceed to block 286 and send the pet-conscious threshold value to the low-power processor 22. The low-power processor 22 may then use the pet-conscious threshold value to detect the presence of a human.

In certain embodiments, the pet-conscious threshold value may be used for certain devices 10 but not all of the devices 10. For example, referring back to FIG. 16, the device 10 on the wall 274 may not use the pet-conscious threshold value because the presence of the pet may not be misinterpreted as the presence of a human. However, the device 10 on the ceiling 272 may use the pet-conscious threshold value because its corresponding sensing range 278 may be influenced by the presence of a pet. In this manner, each device 10 may be specifically calibrated to accurately detect the presence of a human.

Figure 18:
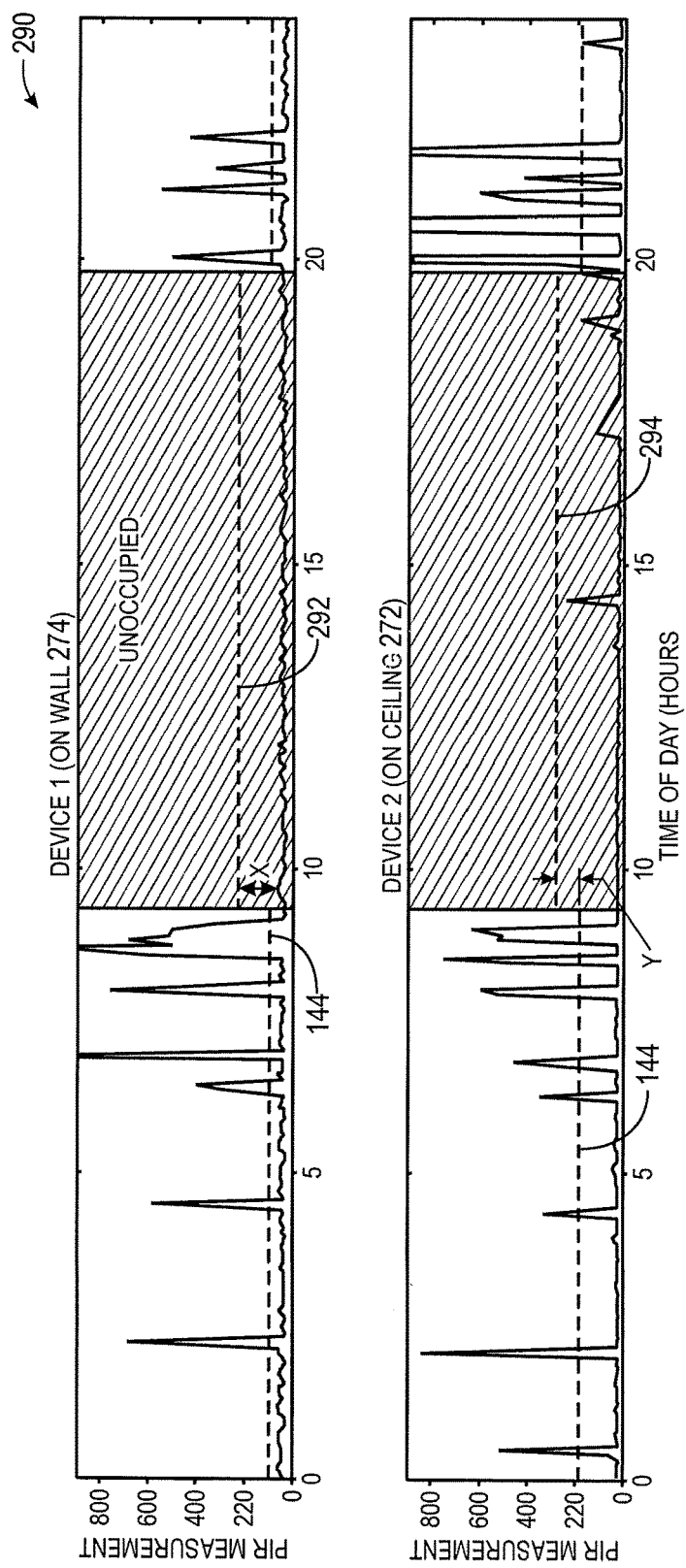
FIG. 18 illustrates graphs of sensor measurements associated with PIR sensors and thresholds associated with a presence of a human being for the two general devices of FIG. 16, in accordance with an embodiment.

For example, FIG. 18 illustrates graphs 290 of sensor measurements associated with a first PIR sensor 24 acquired by the device 10 on the wall 274 and a second PIR sensor 24 acquired by the device 10 on the ceiling 272. As shown in FIG. 18, the thresholds used to detect the presence of a human are different for the device 10 on the wall 274 and the device 10 on the ceiling 272. For example, the device 10 on the wall 274 may use increase its occupancy threshold from threshold 144 by X amount (e.g., X millivolts) to threshold 292 during the unoccupied period of time when humans are not expected to be present. In the same manner, the device 10 on the ceiling 272 may increase its threshold 144 by Y amount (e.g., Y millivolts) to threshold 294 during the unoccupied period of time when humans are not expected to be present. By increasing the respective threshold for each respective device 10 by a respective amount, each respective device 10 may account for the presence of a pet during the unoccupied period of time. As such, each respective device 10 may more accurately detect the presence of a human during the unoccupied period of time, as opposed to falsely detecting the presence of a human when instead a pet is present. Further, by using two different thresholds for two different devices 10, the likelihood of one device 10 detecting the presence of a human when a second device 10 in the same vicinity does not detect the human presence reduces, thereby improving the cohesiveness between the operations of both devices 10.

In certain embodiments, each PIR sensor 24 may use a different a PIR sensor threshold when the presence of a human is expected (i.e., occupied) and when the presence of a human is not expected (i.e., unoccupied). Keeping this in mind, FIG. 14 illustrates how the respective PIR sensor threshold 144 may increase during unoccupied periods of time for each PIR sensor 24.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a light source;
a sensor configured to acquire a first set of data;
a first processor communicatively coupled to the sensor and configured to consume a first amount of power; and
a second processor communicatively coupled to the first processor and configured to consume a second amount of power, wherein the second amount of power is greater than the first amount of power;
the first processor being further configured to store the first set of data in a memory;
the second processor being further configured to determine a threshold indicative of presence of the living being based on the first set of data, wherein the threshold is determined by determining a noise floor in the first set of data and a standard or absolute deviation of the first set of data, wherein the threshold is a number of standard or absolute deviations away from the noise floor, wherein the noise floor is established, at least in part, based on data acquired by the sensor when a space is unoccupied; and
the first processor being further configured to send a first signal indicating the presence of the living being when at least one measurement acquired by the sensor exceeds the threshold, wherein the first signal causes the light source to illuminate.

2. The electronic device of claim 1, wherein the sensor is a passive infrared sensor.

3. The electronic device of claim 1, wherein the first set of data acquired by the sensor varies based at least in part on temperature.

4. The electronic device of claim 1, wherein the first processor is configured to store the first set of data in the memory when the living being is not expected to be present in a space monitored by the sensor.

5. The electronic device of claim 1, wherein the second processor is configured to operate in a low-power state when the first processor stores the first set of data in the memory.

6. The electronic device of claim 5, wherein the first signal is configured to wake up the second processor from the low-power state.

7. The electronic device of claim 1, wherein the second processor is configured to:
receive an input configured to indicate that a non-human animal is expected to be present in a space monitored by the sensor; and
adding an amount to the threshold when the input has been received to avoid falsely detecting a presence of a human when the animal is present in the space.

8. The electronic device of claim 1, wherein the second processor is configured to:
receive a second set of data acquired by the sensor; and
send a second signal to the first processor to store the first set of data when none of one or more measurements of the second set of data exceeds an initial threshold over a period of time.

9. The electronic device of claim 1, comprising a light source configured to illuminate when the at least one measurement acquired by the sensor exceeds the threshold.

10. An electronic device, comprising:
a light source:
a sensor configured to acquire a first set of data;
a first processor communicatively coupled to the sensor and configured to consume a first amount of power; and
a second processor communicatively coupled to the first processor and configured to consume a second amount of power, wherein the second amount of power is greater than the first amount of power;
the first processor being further configured to store the first set of data in a memory;
the second processor being further configured to determine a threshold indicative of presence of the living being based on the first set of data, wherein the threshold is a number of standard or absolute deviations away from a noise floor, wherein the noise floor and the standard or absolute deviation is determined based of the first set of data, wherein the noise floor is established, at least in part, based on data acquired by the sensor when a space is unoccupied;
the first processor being further configured to send a first signal indicating the presence of the living being when at least one measurement acquired by the sensor exceeds the threshold, wherein in response to the first signal, the first processor wakes up the second processor; and
wherein the second processor is configured to:
receive a second set of data acquired by the sensor; and send a second signal to the first processor to store the first set of data when none of one or more measurements of the second set of data exceeds an initial threshold over a period of time.

\* \* \* \* \*